Figure 1:
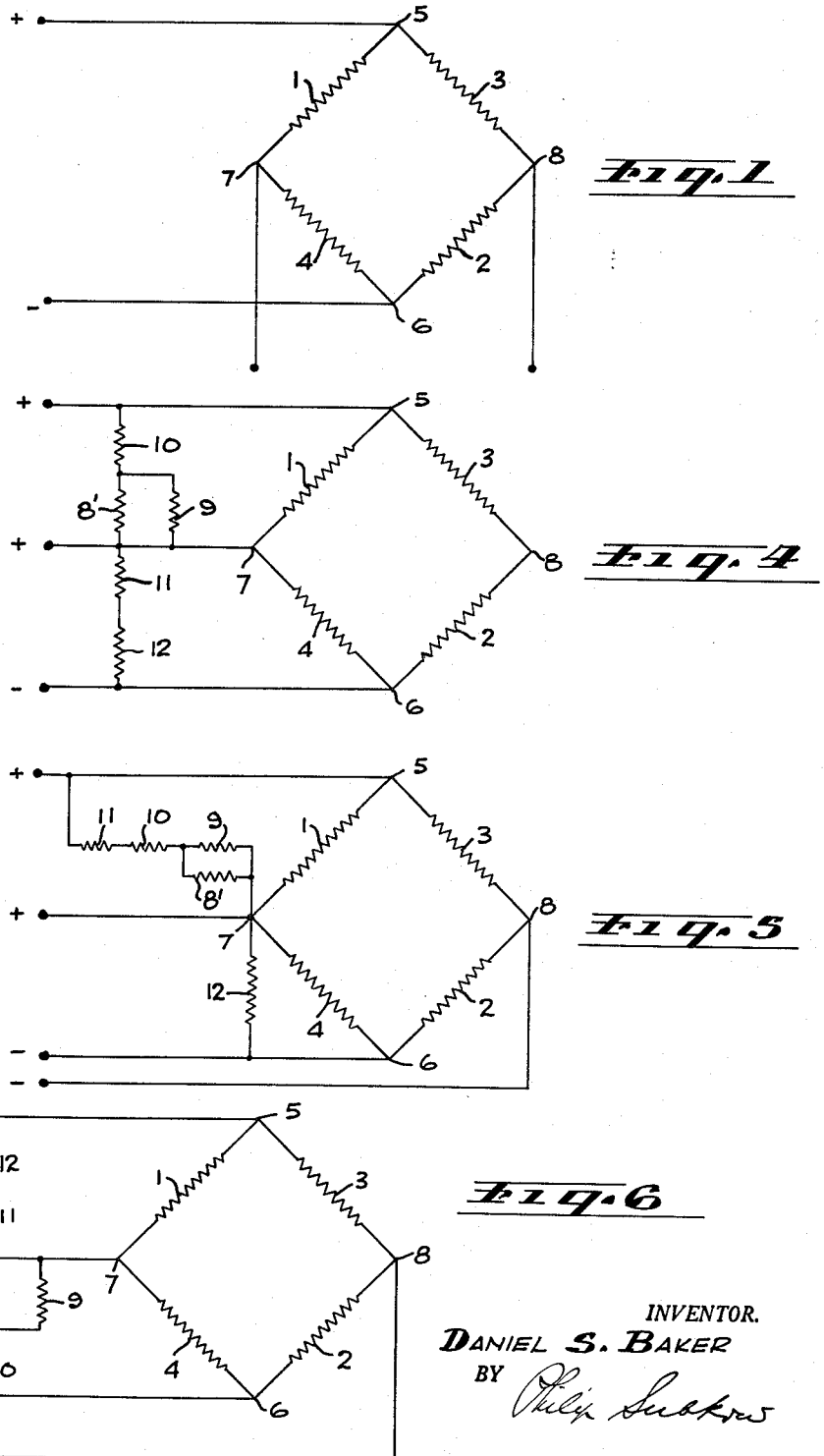

Nov. 19, 1963

D. S. BAKER 3,111,620

BRIDGE COMPENSATION CIRCUITS

Filed April 23, 1962

4 Sheets-Sheet 2

INVENTOR.
DANIEL S. BAKER
BY
ATTORNEY.

Nov. 19, 1963   D. S. BAKER   3,111,620
BRIDGE COMPENSATION CIRCUITS
Filed April 23, 1962   4 Sheets-Sheet 3

INVENTOR.
DANIEL S. BAKER
BY
Philip Subkow
ATTORNEY

Nov. 19, 1963 D. S. BAKER 3,111,620
BRIDGE COMPENSATION CIRCUITS
Filed April 23, 1962 4 Sheets-Sheet 4

INVENTOR.
DANIEL S. BAKER
BY Philip Subkow
ATTORNEY.

United States Patent Office 3,111,620
Patented Nov. 19, 1963

3,111,620
BRIDGE COMPENSATION CIRCUITS
Daniel S. Baker, Sepulveda, Calif., assignor to Statham Instruments, Inc., Los Angeles, Calif., a corporation of California
Filed Apr. 23, 1962, Ser. No. 189,517
11 Claims. (Cl. 323—75)

This invention is an improvement on the non-linear compensation networks described and claimed in the Peter R. Perino application Serial No. 61,612, filed October 10, 1960, in order to compensate for the so-called zero shift of transducers employing Wheatstone bridges as the sensing element, particularly resistance bridges. In that application is described the use of a parallel resistance network composed of a resistor whose resistance decreases with increase in temperature, called a negative resistor, and parallel with a resistor whose resistance increases with increase in temperature, known as a positive resistor. Such resistors are well known, and such negative resistors have also been called thermistors. The positive resistors show a substantially linear change of resistance with temperature, while the thermistors have a resistance which changes exponentially negatively with temperature, decreasing as the temperature increases.

As is described in the aforesaid Perino application, by employing such thermistors in parallel with the positive resistor, the net resistance change will first increase with increase in temperature, pass through a maximum, and then decrease in temperature. By selecting the magnitudes of the resistance values of the thermistors, as well as their resistance change with temperature and the resistance value of the positive resistor and its coefficient of resistance change with temperature, the degree of convexity of the variation of the resistance with temperature may be controlled. Such a network is here termed a non-linear network. The degree of convexity and the magnitude of the resistance at the maximum can also be varied by placing a resistor which changes but little with temperature, hereinafter called a temperature-insensitive resistor, in parallel with the aforesaid parallel network. Such an insensitive resistor is termed the controlling resistor in this specification. Such a compensating network may be employed to reduce or cancel the zero shift by introducing a network in parallel or in series with one of the legs of the Wheatstone bridge, depending on the nature of the zero shift.

I have found that for most commercially available thermistors and positive resistors, the resistance value of these resistors, positive, negative and insensitive, becomes quite large. When such a parallel network is employed, I have found that I may obtain compensation for zero shifts which are positive or negative by employing such parallel networks; but, instead of controlling the convexity described above by the insensitive resistor in parallel as the controlling resistance with the negative and positive resistors, I employ an insensitive resistor in series therewith in series with the parallel network described above, in place of or in addition to the insensitive resistor, and employ these networks as a shunt network in one of the legs of the Wheatstone bridge.

For purposes of further description, a negative zero shift may be termed to be one in which the transducer whose bridge is balanced at a given temperature, with no variation of the impedance of the legs of the bridge imposed on the bridge resulting from a variation of the conditions sensed by the transducer as existing when such transducer is balanced, becomes unbalanced to give an output if the temperature is either decreased or increased, which output increases algebraically on both sides of the calibration temperature, i.e., becomes less positive or more negative. A positive zero shift is one which moves in the opposite direction, i.e., which becomes less negative or more positive on both sides of a minimum value as the temperature moves from that at which the minimum occurs. By employing my series-parallel non-linear network, instead of a parallel non-linear network in which the controlling resistor is in parallel with the non-linear network, I need much lower values for the insensitive, positive, and negative resistors. I also may obtain compensation of both the positive and negative zero shift. This I may do without opening the bridge, i.e., without disconnecting the legs of the bridge to introduce the compensation network in series with one of the legs. In this manner a transducer may be compensated without disturbing the bridge circuit by merely adding a shunt network to one of the legs of the bridge, as will be more fully described below.

My invention will be further described by reference to the drawings, of which:

FIGS. 1, 4, 5, 6, 7, 10 and 11 are schematic wiring diagrams showing the application of my non-linear compensation networks to Wheatstone bridge circuits; and FIGS. 2, 3, 8 and 9 are charts illustrating my invention.

FIG. 1 illustrates a conventional bridge composed of impedance elements 1, 2, 3 and 4 which form the legs of the Wheatstone bridge of a transducer, which is assumed to be balanced at a given temperature called the calibration temperature. Such a bridge may be a resistance bridge as in the transducers employing unbonded strain wire or filters or other strain sensitive or piezo resistive filaments or films such as semi-conductor filaments or films. Illustrative of transducers to which my invention may be applied are the following U.S. patents: U.S. Patent 2,600,701; U.S. Patent 2,778,624; U.S. Patent 2,622,176; U.S. Patent 2,453,549; and U.S. Patent 2,840,675.

The input voltage is applied between corners 5 and 6. There is thus no output voltage at 7 and 8 holding the input voltage across the corners 5 and 6 constant. In most transducers which employ such bridges as sensing means responsive to some conditions to be sensed, as, for example, in the transducers of the patents referred to above, an output voltage appears at 7 and 8, and the zero shift appears even though the transducer is under zero conditions, even though the condition to be sensed is not varied from that at which the bridge is calibrated and balanced. The transducer acts as if it were sensing a change in the condition, e.g., a change in pressure or acceleration. This effect may arise from one or more of a multitude of factors. Thus, differential expansion of the parts of the transducer, variation in flexibility of the suspensions or connections, changes in the tension of the filaments if these are the impedance elements of the bridge, and also changes in resistivity of such filaments and the associated electrical circuit will upset the balance of the bridge and give an output. The transducer acts as if the bridge legs were changing in resistance, although the actual change in resistance of the legs of the bridge does not account in full for the zero drift. In fact, part of the zero drift may result from changes in tension due to the effect of temperature on the tension imposed in the wires arising from the changes in the modulus of the elasticity and the differential expansion referred to above. Whatever be the cause of the above zero drift, for accurate measurements it is necessary either to allow for the zero drift or to remove the zero drift. For most purposes, it is desirable to remove or to modify the zero drift.

If the bridge has a stable zero, no output voltage will apear at 7 and 8 if the ambient temperature changes. Such a bridge is said to have a stable zero. It is assumed that the condition to be sensed by the transducer, for example, pressure if the transducer is a pressure gage or acceleration if the transducer is an accelerometer, is maintained constant at the value of the calibration. Such a condition is termed a zero condition. With a thermally stable zero, the bridge shows no output, the bridge balance remaining undisturbed.

Figure 2:
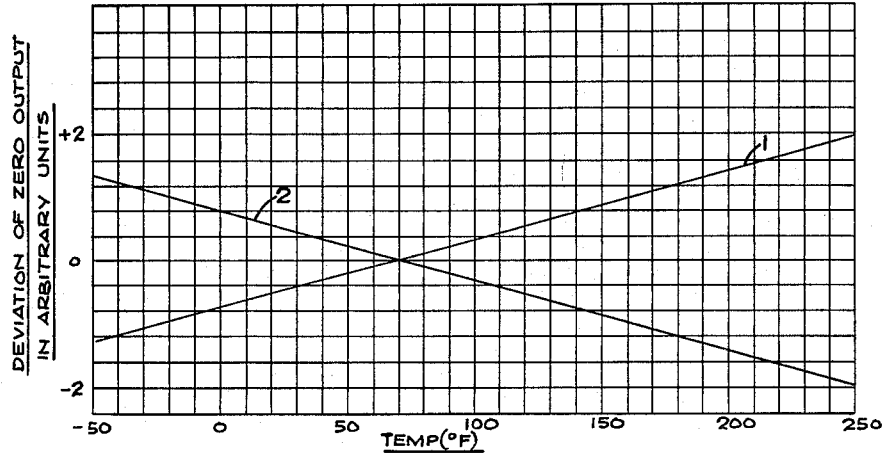

FIG. 2 illustrates the deviation from zero, for example, bridge output for a transducer. Line 1 shows that below the calibration temperature illustrated as 70°, the output is of the opposite polarity to that above 70°. The transducer has a linear zero drift with positive rotation, to wit: the slope of line 1 is positive; and 2 illustrates a transducer with a negative zero drift, to wit: one in which the slope is negative. However, in many transducers, depending upon accidental combinations of factors which are difficult to sort out, the zero drift is not a linear zero drift.

Figure 3:
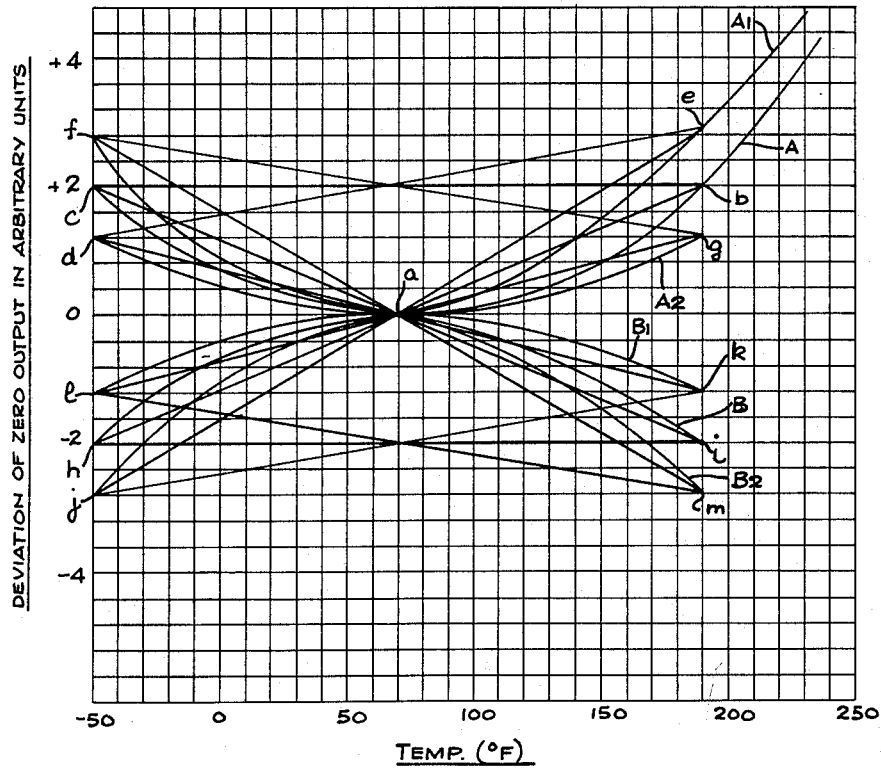

FIG. 3 illustrates various forms of non-linear variation in the zero as a result of changes in temperature. Thus, in FIG. 3, curve A is the variation in the output of a transducer with changes in temperature which is said to have a positive non-rotated hook. It will be observed that the bridge was balanced at one calibration temperature, for illustration purposes shown in FIG. 3 as 70°. The output increased as the temperature to which the transducer is subjected departed on either side from the calibration temperature. It will be observed that lines drawn from the calibration temperature at point $a$, to equal temperature intervals on both sides of point $a$, to wit, $b$ and $c$, give an isosceles triangle whose base $b$—$c$ is parallel to the zero axis. Curve $A_1$ shows a transducer whose zero drift has a positive hook with positive rotation. The base of the triangle $a$—$d$—$e$, to wit, base $d$—$e$ has a positive slope. Curve $A_2$ is a transducer having a zero drift which shows a positive hook with a negative rotation. The base of the triangle $a$—$f$—$g$, to wit, the base $f$—$g$, has a negative slope. In like manner, curve B shows a transducer having a non-rotated negative hook, since the base of the triangle $a$—$h$—$i$, to wit, base $h$—$i$, is parallel to the zero axis; and curve B' is a transducer having a negative hook with positive rotation, since the base of the triangle $a$—$j$—$k$, to wit, base $j$—$k$, has a positive slope. Curve $B_2$ shows a transducer with a negative hook with negative rotation, since the base of the triangle $a$—$l$—$m$, to wit, the base $l$—$m$, has a negative slope.

Where the zero drift shows a positive hook or a negative hook, the apparent change in the resistance of the legs is not necessarily due entirely or at all to changes in the resistivity of the leg. This may be, and often is, due to the force introduced into the transducer, due solely to changes in temperature which mechanically vary the impedance of the leg as described above. In like manner, when the transducer shows a negative hook, the transducer acts as if the change in the bridge resistance is changing the force in an opposite direction.

In employing my invention, I treat the apparent change of the bridge resistance as if the legs are, indeed, changing resistance as described. The transducer is deemed to be acting as if the condition sensed by the transducer were changing but the ambient temperature remained at the calibration temperature. If the hook be a positive one, I introduce the compensating network in parallel with one of the positive legs and use a resistor which is relatively insensitive to temperature to balance the opposite leg so that the bridge is balanced at the calibration temperature. In describing legs as positive and negative, I define a leg which is connected to the positive pole of the input voltage as a positive leg, and the leg which is connected to the negative load of the resistor of the input voltage as a negative leg.

When the positive hook has a positive rotation, I also employ in series with the non-linear compensating network a positive resistor to rotate the hook in a negative direction to reduce the positive slope of the base of the triangle.

When the transducer shows a negative hook, I place the compensating non-linear network in parallel with one of the negative legs holding the bridge in balance by shunting a positive leg with a relatively insensitive resistor.

When the hook is a rotated hook with a negative rotation, I introduce a positive resistor in series with or in place of the balancing insensitive resistor in parallel with a positive leg. When a negative hook shows a positive rotation, I introduce the positive reactor in series with the non-linear network which is in parallel with the negative leg.

FIG. 4 shows a Wheatstone bridge circuit employing a compensation for a negative hook with a negative rotation employing a positive resistor 8' in parallel with the negative resistor 9, and in series with a resistor 10 which is substantially insensitive to changes in temperature. The network is shunted across one of the positive legs, e.g., 1. I employ a balancing resistor composed of the insensitive resistor 12 in series with a positive resistor 11 shunting one of the negative legs 4. When the negative hook is not rotated, I may omit the resistor 11. Where no rotation is present, resistor 11 may be omitted.

FIG. 5 illustrates the compensation for a negative hook with a positive rotation. I employ the non-linear compensating network composed of the insensitive resistor 10, in series with the positive resistor 11 and also in series with the parallel network composed of the negative resistor 9 and the positive resistor 8'. The network is shunted across one of the positive legs, e.g., 1. The bridge is balanced by the insensitive resistor 12. When the negative hook is not rotated, the positive resistor 11 may be omitted and the bridge balanced by the insensitive resistor 12.

FIG. 6 illustrates compensation for a positive hook with a positive rotation. The compensating network comprised of an insensitive resistor 10 in series with the parallel network composed of a positive resistor 8' and a negative resistor 9 is shunted across a negative leg and balanced by a positive resistor 11 in series with the insensitive resistor 12, which may or may not be employed, if not required for balance. Where the hook is not rotated, the positive resistor 11 may be omitted and the bridge balanced by the insensitive resistor.

Figure 7:
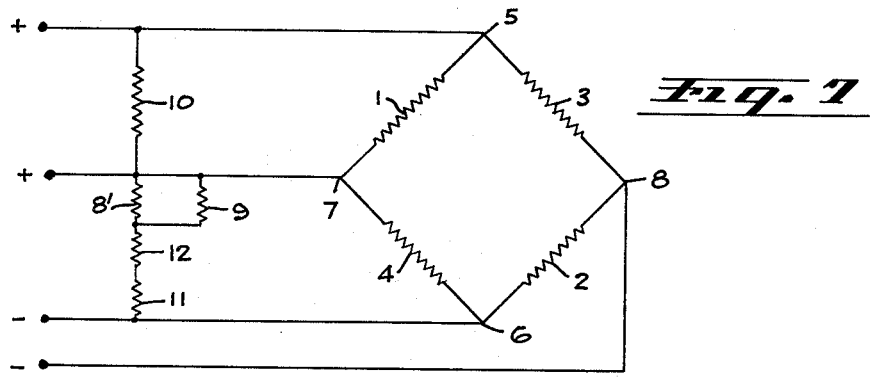

FIG. 7 illustrates the compensation for positive hook with a negative rotation. A negative leg is shunted by a network composed of an insensitive resistor 12 in series with a positive resistor 11 in a parallel network composed of a positive resistor 8' and a negative resistor 9. The bridge is balanced by the insensitive resistor 10, shunted across the positive leg, for example 1. As above, when the hook is non-rotated, the positive resistor 11 may be omitted.

The magnitude of the various resistors to compensate for a given hook depends upon the temperature coefficients of the resistors and the magnitude of the resistors.

Figures 8, 9:
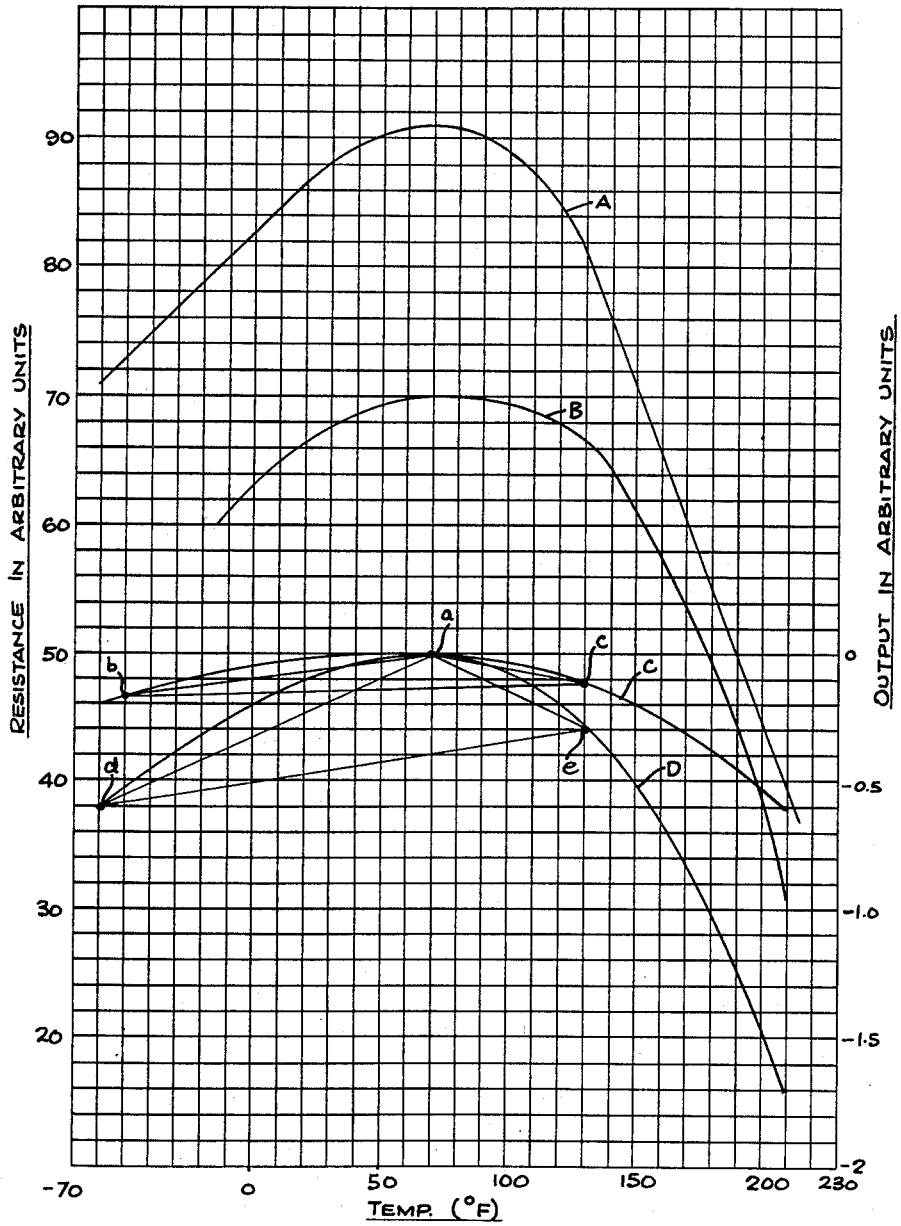

FIG. 8 shows the effect of temperature on the resistance of a non-linear network composed of a positive resistor such as 8' and a negative resistor such as 9 in parallel.

Curve A differs from curve B in that the resistance of the positive resistor in the network of curve B is greater at each temperature than that employed in the network of curve A.

FIG. 9 illustrates the effect of the insensitive resistor employed in series with the non-linear network. Thus, in the circuit of FIG. 10, employed in a transducer, the total value of the resistance across the input bridge corners 5 and 6 composed of the insensitive resistor 12 in series with the non-linear parallel network 8' and 9, which is in turn in series with an insensitive resistor 10, may, for example, have thermal zero drift as shown in curves C and D in which the abscissa is given as temperature and the ordinate is bridge output in arbitrary units, for example, in millivolts per volt input at the input at 13 and 14. As the value of the resistance of the series insensitive resistor 10 increases, the curve flattens without the shift of the maximum, i.e., from D to C. By selecting the values of the temperature-insensitive and the temperature-sensitive resistors and the temperature coefficients of the sensitive resistors, I may match the compensating resistors to the hook to obtain zero compensation. It will be seen that the series insensitive resistors tend to flatten, i.e., reduce the hook composed of the triangle b—a—c from, for example, the hook composed of the triangle d—a—e. Instead of employing the insensitive resistor 10 in series with the parallel resistors 8' and 9, if the resistor is placed in parallel with the parallel resistance network as in FIG. 10, the magnitude of the resistance required for the same degree of hook compensation will be much greater.

Figure 10:
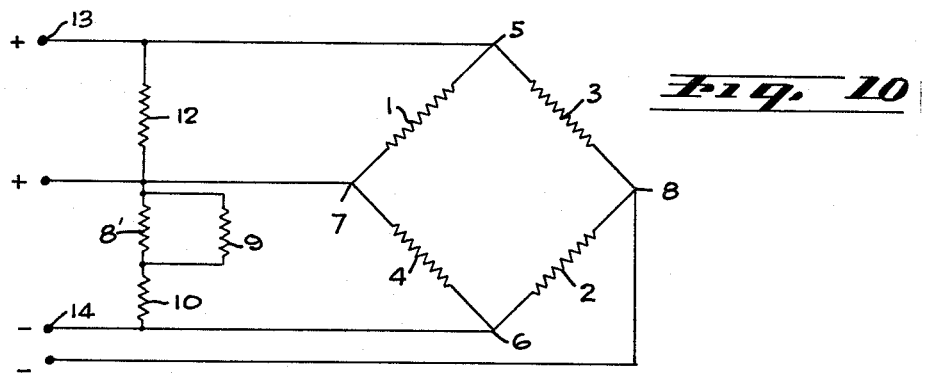
Figure 11:
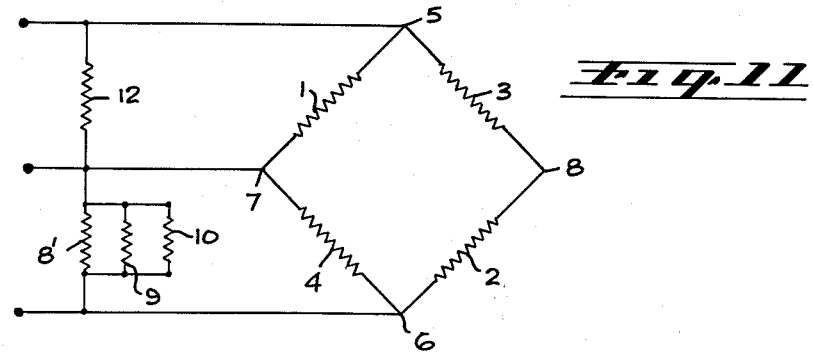

Thus, as an example of the order of magnitude of the resistors which are necessary in order for the compensating non-linear networks to have like resistances, the following table illustrates the comparative value of the resistors in FIGS. 10 and 11.

| Resistor | Resistance Value, ohms | |
|---|---|---|
| | Fig. 10 | Fig. 11 |
| Resistor 12 | $5 \times 10^3$ | $5 \times 10^3$ |
| Resistor 8 | $1 \times 10^2$ | $1 \times 10^5$ |
| Resistor 9 | $1 \times 10^3$ | $1 \times 10^6$ |
| Resistor 10 | $4.91 \times 10^3$ | $5.29 \times 10^3$ |

While I have described a particular embodiment of my invention for purposes of illustration, it should be understood that various modifications and adaptations thereof may be made within the spirit of the invention, as set forth in the appended claims.

I claim:

1. A temperature compensated Wheatstone bridge circuit composed of four legs, comprising a non-linear resistance network, said non-linear resistance network comprising a non-linear parallel resistance network including a negative resistor in parallel with a positive resistor, said non-linear network in shunt with one of the legs of said bridge.

2. In the circuit of claim 1, wherein said non-linear resistance network is shunted across a positive leg of said bridge.

3. In the circuit of claim 2, in which a positive resistor is shunted across a negative leg of said bridge.

4. In the circuit of claim 2, in which an insensitive resistor is shunted across a negative leg of said bridge.

5. In the circuit of claim 2, in which an insensitive resistor in series with a positive resistor is shunted across a negative leg of said bridge.

6. In the circuit of claim 1, in which said non-linear network is in series with a positive resistor, and said non-linear network and said positive resistor are shunted across a positive leg of said bridge.

7. In the circuit of claim 6, in which an insensitive resistor is shunted across a negative leg of said bridge.

8. In the circuit of claim 1, in which the non-linear network is shunted across a negative leg of said bridge.

9. In the circuit of claim 8, in which an insensitive resistor is shunted across a positive leg of said bridge.

10. In the circuit of claim 8, in which a positive resistor is shunted across a positive leg of said bridge.

11. In the circuit of claim 8, in which a positive resistor in series with an insensitive resistor is shunted across a positive leg of said bridge.

No references cited.